July 27, 1937.  C. A. MATSON  2,088,155
AUTOMOBILE NO-ROLL-BACK BRAKE
Filed Sept. 18, 1935  3 Sheets-Sheet 1
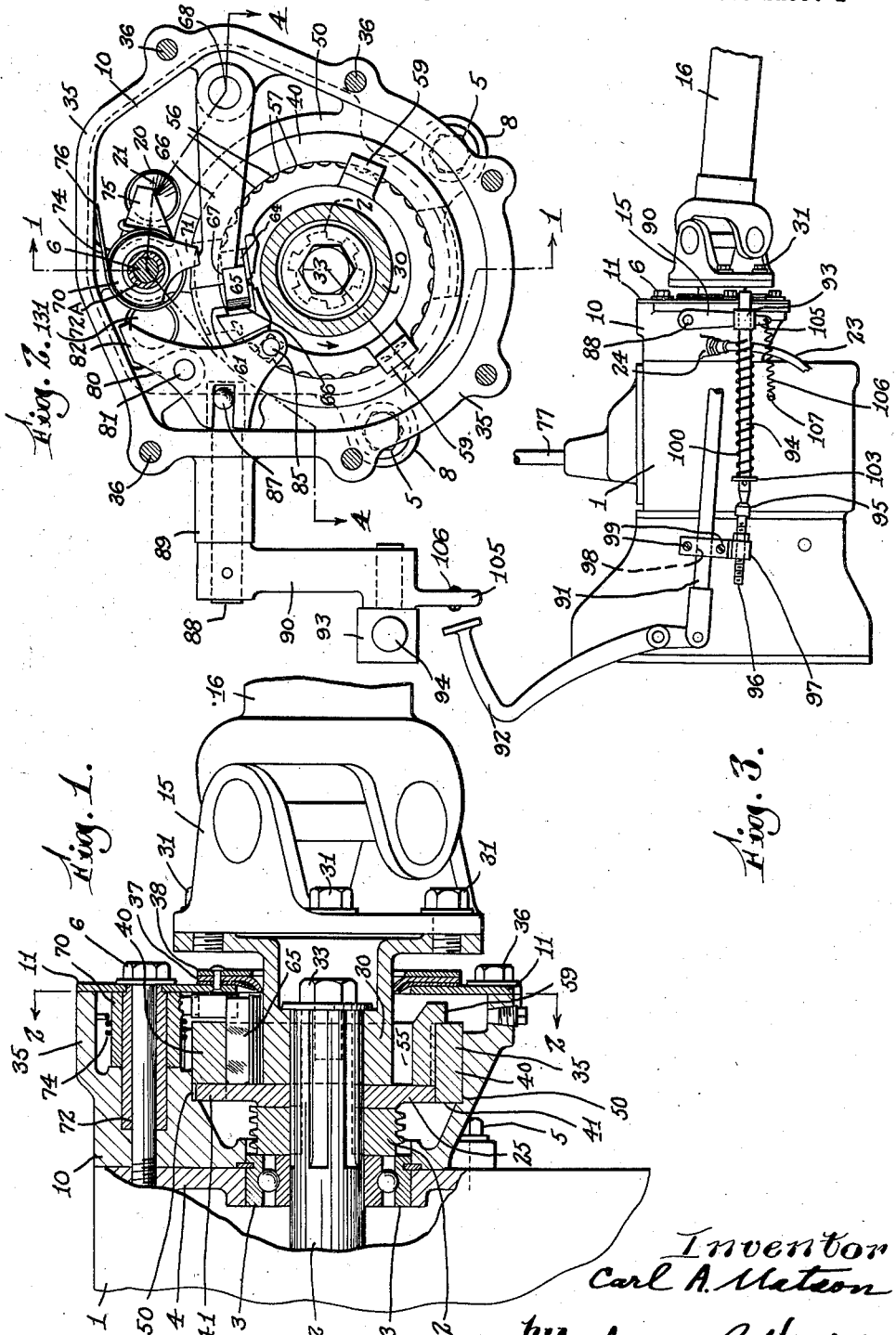
Inventor
Carl A. Matson
by James R. Hodder
Attorney

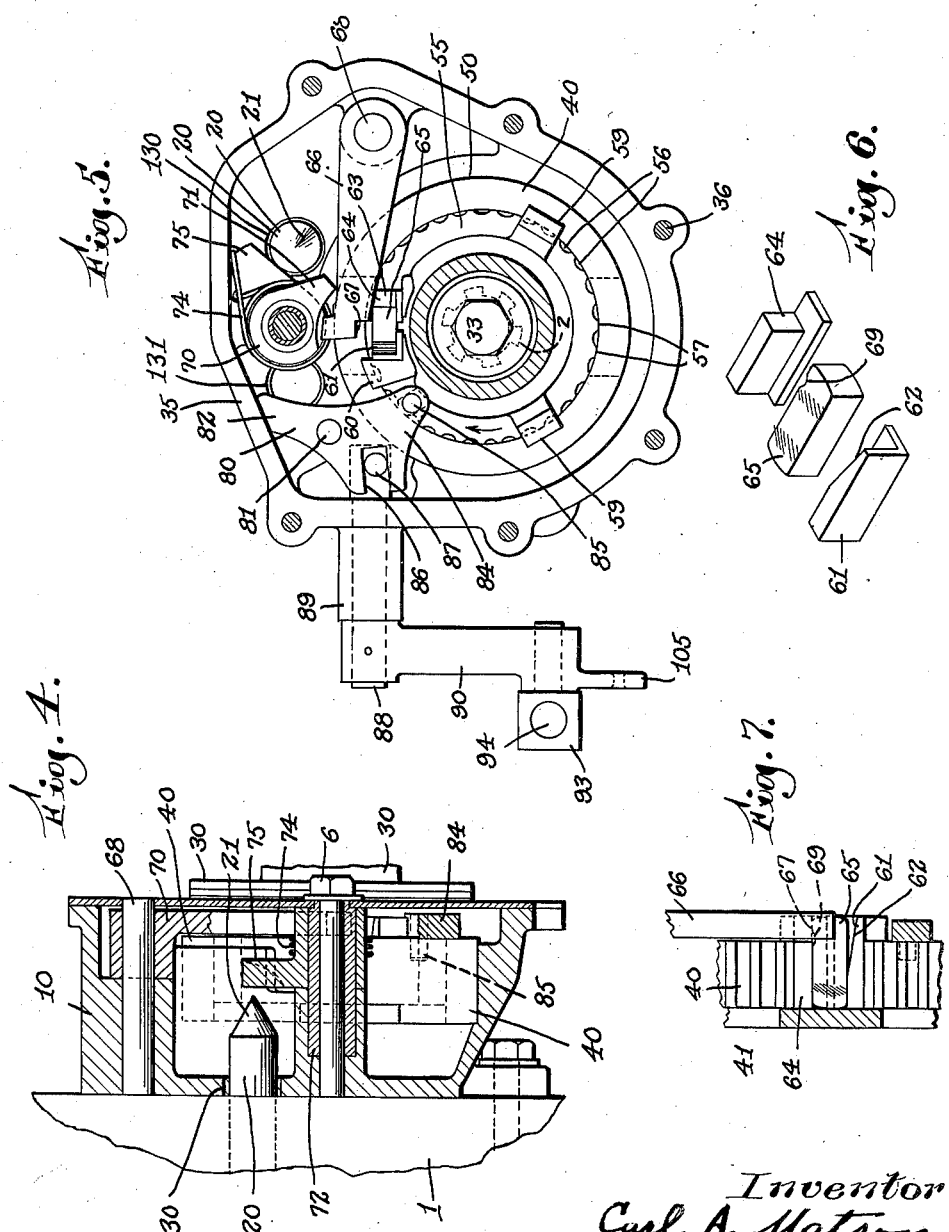

July 27, 1937.  C. A. MATSON  2,088,155
AUTOMOBILE NO-ROLL-BACK BRAKE
Filed Sept. 18, 1935  3 Sheets-Sheet 3
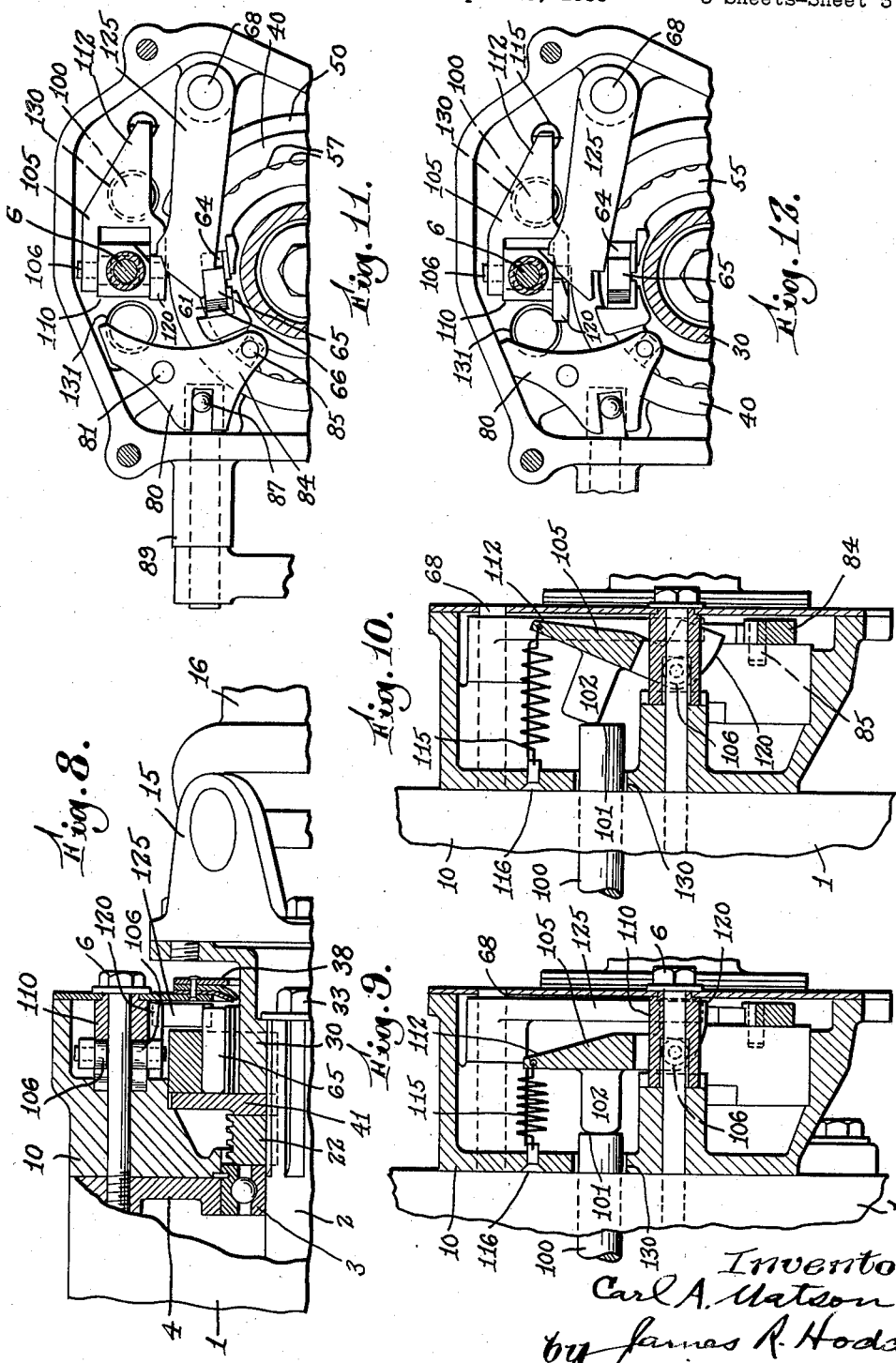

Patented July 27, 1937

2,088,155

UNITED STATES PATENT OFFICE 2,088,155

AUTOMOBILE NO-ROLL-BACK BRAKE

Carl A. Matson, Swampscott, Mass., assignor of one-half to John B. Jameson, Concord, N. H.

Application September 18, 1935, Serial No. 41,066

3 Claims. (Cl. 192—4)

My present invention is a novel and improved mechanism of the type shown in my prior application Ser. No. 744,006, and the object of the invention is to improve and perfect devices of this type, and particularly to simplify the construction and insure positive operation at all times.

In my development of automatic devices for the no-roll-back-brake or reverse clutch for automobiles, the said prior application illustrates and claims broadly what I have termed as a clamping ring, or split ring structure, as an important feature, and in my present application I have improved and further developed this type of no-roll-back automatic braking mechanism by simplifying the same, by eliminating one of the ring-like members heretofore considered necessary, greatly improving the operation.

Further important features of the present invention consist in providing interchangeable and renewable bearing devices, preferably of hardened steel or metal alloy which will take up the thrust and strain in the operation of the mechanism.

A still further and important feature consists in the provision of a unit which may be all assembled at the factory and thereupon applied quickly and directly onto existing automobile structures, eliminating the prior necessity of assembling practically the entire unit while applying it to the vehicle necessitating, in effect, a building of the unit into the automobile to which it may be applied.

A further novel, improved and important feature of the present invention, is the provision of means which will operate directly in connection with the original and standard types of shifting levers, or shifting "rails", to shift gear transmission mechanism in commercial automobiles of usual types. Heretofore various changes were necessary in the original structure, such as for example, removing one or more of the shifting rails and substituting different and longer ones, specially formed to cooperate with the braking devices of the unit to be attached. In one form of my present improved unit, I do not remove or change the shifting rail to make it cooperate with the unit, but utilize the original element, and cause the unit to operate on release by the normal actuation of one of the original shifting levers or rails. This greatly simplifies and shortens the time, work, labor and skill required in applying my improved unit to an automobile, and is of considerable importance.

Particularly is this important after the car has been assembled, and the floor boards, mats, upholstery, chairs, foot pedals, and transmission cover are in place. None of these have to be either moved, marred, removed or replaced when my improved unit is applied, and the time and work involved is a fraction of that formerly necessary, and enables my unit to be installed at a minimum of expense.

Referring to the drawings illustrating a preferred embodiment of my present invention, Fig. 1 is a side view partly in cross-section on the line 1—1 of Fig. 2, illustrating my improved unit attached to an automotive driving mechanism;

Fig. 2 is a cross-sectional view on the line 2—2 of Fig. 1;

Fig. 3 is a side view on a reduced scale of the unit, transmission casing, and attaching means to the brake rod;

Fig. 4 is a cross-sectional view on the line 4—4 of Fig. 2;

Fig. 5 is a cross-sectional view corresponding to that shown in Fig. 2 with the mechanism in inoperative position;

Fig. 6 is a detailed perspective view illustrating the renewable hardened steel bearing members which cooperate with the cramping key, and Fig. 7 is a fragmentary view illustrating the hardened steel bearing members in operative position.

Figs. 8, 9, 10, 11 and 12 illustrate a modification.

As shown in the drawings, I have designated generally a standard type of automotive vehicle transmission casing at 1, in which a driving shaft 2 is rotated at variable speeds depending upon the transmission gears in operative mesh, as desired from time to time by the driver.

My present unit is completely assembled, adjusted, and enclosed, and can be secured directly to the automobile without disassembling or removing the casing enclosing the mechanism.

Also, in carrying out this enclosed unit structure I have provided means which will enable quick attachment to be made to the reverse rod operating the transmission mechanism and to the brake pedal securing operation connection with the latter to the unit at any convenient and readily accessible portion.

I consider the elimination of one of the rings or members heretofore considered necessary in this type of product and the enclosed unit structure, as well as the attaching mechanism, of great importance, permitting my present unit to be incorporated in a vehicle with a minimum of time, work, and skill, while insuring the operating parts always being maintained in the proper adjusted position to which they have been assembled in the factory.

Also, I consider the feature of the hardened bearing members taking up thrusts and strains and preventing undue wear as most important, it being appreciated that cast iron and steel make the best contact surface, whereas cast iron is relatively brittle; and I have added these hardened steel bearing members, which are readily renewable, to the cast iron portion of the mechanism for withstanding sudden blows, thrusts, and strains incident to the operation of the mechanism.

The shaft 2 operates through the usual ball-bearings 3 fitted in a raceway in the end plate or portion 4 of the transmission casing, to which plate 4 my unit is secured by a series or set of bolts 5—5 and 6. The bolts 5—5 are threaded thru appropriate ears or lugs 8—8 formed on the frame of the unit which I have designated at 10, while the bolt 6 passes entirely thru my unit from the rearmost side also holding the cover 11 in position, and thus secures the complete assembled unit with my improved mechanism contained therein directly to the plate 4 of the transmission of the vehicle.

In assembling my present unit, the speedometer casing is first removed between the transmission casing 1 and the driving portion 15 of the universal joint, which is coupled to the propeller shaft 16 and in the space thus provided my complete assembled unit is fitted, first substituting a pointed extension rod 20 to the reverse rod operating the transmission gearing in the casing 1. This extension is to render the no-roll-back brake inoperative when the reverse lever is thrust into position to back the car, as will be further explained.

Thereupon the complete unit 10 with the covering plate 11 is applied, and the bolts 5—5 and 6 positioned in alignment with the usual three tapped recesses in the plate 4, to which the original speedometer casing is secured, are fitted and thereafter the operating rod attached to the brake rod, as shown in Fig. 3, the universal joint coupled, and the mechanism completed.

My present improved structure will now be described.

The shaft 2 is splined, as shown in Fig. 1, and receives the gear 22 fitted into the splined portion substantially in position, as shown in Fig. 1, to drive the speedometer shaft 23, which is led through a proper bearing 24 in the casing 10, see Fig. 3, from the end of which shaft is the usual worm shaft (not shown).

Also fitted on the splined portion of the shaft 2 is a driving flange 25 in constant rotation with the shaft 2 and adapted to cooperate with the clutch members when the vehicle starts reverse rotation, as will be explained. Fitted further on the splined portion of the shaft 2 is the driving member 30 bolted to the portion 15 of the universal joint by bolts 31—31 in the usual spaced relation; and these members are held in assembled position tightly on the splined portion of the shaft 2 by a threaded bolt 33, also as clearly illustrated in Fig. 1. The portion 10 of the unit has an extending flange 35 on which the face plate 11 is attached by a series of bolts 36—36; and a flexible washer 37 held by a plate 38 encircling the driving member 30 provides an oil-tight seal within the unit.

Contained within my unit and fitted to the plate 25 is a rotating ring 40, having a plurality of interlock dovetailed extensions 41 fitted thru corresponding recesses in the plate 25, as clearly shown in Fig. 1, and therefore rotating with said plate 25 and shaft 2. This ring 40 preferably has a bearing contact with a shouldered portion 50 formed in the flange 35 and partially supporting and encircling the ring 40.

The ring 40 is preferably made of hardened steel, and adapted to fit within the inner circumference of the ring 40. I provide my clamping ring 55 of cast iron with a series of fluted portions in the periphery, as indicated at 56, giving a small bearing surface 57 between the adjacent fluted portion 56, and being provided with a pair of overhanging lugs 59—59 which engage the top rim of the ring 40, and all held in assembled position by the face plate 11.

The cramping ring 55 is split or formed with spaced abutting ends, as best shown in Figs. 2 and 5, each being formed with an L-shaped recess to receive hardened steel removable contact members, shown in enlarged detail in Fig. 6. At the end illustrated at the left, in Figs. 2 and 5, viz., at 60, is fitted the bevelled L-shaped members 61; and at the right, viewed in Figs. 2 and 5, at 63 is the hardened steel contact member 64 adapted to fit either side of the cramping key 65. The member 61 has one face bevelled as shown at 62, in order to facilitate the cramping action of the key 65 when the same is engaged by a dog 66 through contact with the notch 67 thereon when the mechanism is in the position shown in Fig. 2 and the shaft 2 starts reverse rotation. The dog 66 is pivoted on a stud 68 and normally is held in position to engage the key 65, shown in Fig. 1, by a locking pawl 70, having a tooth 71 adapted to fit and lock over a shoulder 72 on the upper surface of the dog 66, the pawl 70 encircling a sleeve bearing 72A thru which the bolt 6 passes, and a coiled spring 74 encircling the hub of the pawl 70 and engaging between a bearing on the inside of the flange 35, as shown at 76, and with the other end clamped around an extension 75 of the pawl 70 normally holding the dog 71 in locking position.

When the reverse lever 77 is operated to shift the transmission in the casing 1 or for moving the vehicle backward, the extension 20, which has been previously fitted thereto, as above explained and provided with a pivoted point 21, moves against the arm 75, see Figs. 2 and 5, lifting it, and thus removing the dogs 66 from locking engagement with the key 65, permitting the locking ring 55 to be free from the ring 40 and permitting the gear to be backed freely.

In order to insure the repositioning of the locking pawl 70 and rod 66 against the key 65 for instantly cramping the key and expanding the locking member 55 against the ring 40 under normal conditions of use, I provide a positive means for returning the mechanism into operative position, although after the vehicle has been shifted into any forward speed and run for a short time, the unit will itself assume the locking position of Fig. 2, ready for instant use as a brake against any reversing of the ring 2. This is caused automatically by the tension of the spring 74, thru the pawl 70 upon the dog 66 and to the device to the opposite side of the ring.

However, for the purpose of instantly restoring the mechanism from the free position shown in Fig. 5 to a position ready for locking operation, as shown in Fig. 2, I provide a lever 80 pivoted at 81 to a stud on the frame 10, having one arm 82 bearing against the part 25 of the casing 10, and with the other end 84 fitted to receive a stud 85 connecting the lever 80 with the ring 55. An open recess 86 is adapted to receive a stud 87 secured on a shaft 88 extending thru a bracket 89 and attached to an arm 90 adapted to be secured to the rearwardly extending brake rod 91 operated by the foot brake 92 of the vehicle.

To complete the connection between the lever 90 and the brake 92, I provide a hub 93 through which a shaft 94 passes, having at its opposite end a flexible bearing 95, with a threaded screw 96 passing thru a correspondingly threaded block 97, which block is a part of the clamp 98 adapted to engage and be secured to the brake rod 91 by clamping screws 99—99 in any convenient and adjusted position.

Encircling the shaft 94 is a coil spring 100 bearing between the block 93 and a washer 103, while I provide the lever 90 with a short extension 105, to which a spring 106 is attached, having the other end secured at 107 to the casing 1.

With the construction just described, a slight touch on the brake pedal 92 will move the lever 90 and consequently rock the lever 80, moving the entire ring 55 to the left, viewed in Figs. 2 and 5, until the notch 67 on the dog 66 will snap in behind the key 65, being impelled to this position by the spring 74, the reverse rod 20 meanwhile having been removed when the transmission has been shifted to any of the forward speeds.

Consequently, the mechanism will be in "ready" position, as shown in Fig. 2, until and unless the reverse lever is again operated to lift the locking pawl 70 and the dog 66. A slightly bevelled portion 69 in the key 65 facilitates the rocking of the key, and gives additional leverage to the holding dog above the width of the ring 40, as best shown in Fig. 7.

With my unit simplified as above described, with an extremely compact form, eliminating all extra parts, and particularly the extra ring of my said prior application 744,006, I have provided an efficient and operative construction which can all be assembled, slushed with lubricant, within the part 10, flange 35, and plate 11, and thereupon attached directly to the part 4 of the transmission casing by the bolts 5—5 and 6.

Both the rails extend slightly into the unit but only the reverse lever rail 20 is utilized in my present form to operate the unit, and any sudden catching or locking of the clutch, should the pedal be pressed, is prevented thru the yielding of the spring 94. The wearing members or shoes 61 or 64 are readily renewed and replaced by simply removing the face plate 11, and undue wear on the cast iron clamping member 55 is thus eliminated.

With the provision of an adjustable attachment on the brake member at any convenient place, and by simply securing the three bolts 5—5 and 6, the entire unit is fitted in place at a minimum of time, labor, expense, and skill and at a fraction of the time formerly required to build in to the automobile an entire no-roll-back brake construction.

These features are of considerable importance and of great advantage, and I wish to claim the same herein broadly.

It will also be appreciated that while I prefer to form the member 55 of cast iron and the ring 40 of steel, these may be reversed and the member 55 may be of steel and the ring 40 of cast iron in order to get the benefit of the frictional engagement between these metals.

In the modification shown in Figs. 8, 9, 10, 11 and 12, I have eliminated entirely the necessity of removing one of the shifting rails to replace same with a longer element 20 with its conical end 21 to operate the arm 75 of the pawl 70 for release and backing. In this form I have utilized the original shifting lever or rail, designated at 100, with its square or blunt end 101 to contact with a stud 102 of a lever 105 which is in place of the pawl 70 of the former construction. The lever 105 is adapted to rock upon a pair of trunnions 106, 106, which are mounted to slide into the base of a groove in a member 110 which is bored to fit over or to receive the shaft of the bolt 6. This pawl 105 has one arm 112 extending toward one side of the pivot trunnions, substantially as shown, to which one end of a contractile spring 115 is attached, with its opposite end secured to a screw 116 threaded into the unit casing 10 and adjustable for tension, if desired. The pawl 105 has a second arm 120 adapted to lock or unlock the dog 125, which corresponds to 66 in the former construction, and is also mounted on the pivot 68. Recesses 130 and 131 are formed in the back of the unit to permit normal movement of the transmission shifting rails, particularly that as shown by 20 or 100 for operating the release of the dog 66 or 120 as above explained.

In the modification employing levers 105 and 125, the unit is normally in position as shown in Fig. 11 with the dog 125 holding the key 65 in position to lock automatically and hold the propeller shaft 2 against reverse rotation. Upon shifting the gear transmission lever for reverse driving position, the rail 100 with its end 101 normally extending through the opening 130 slightly into the unit, contacts with the stud 102 of the pawl 105 rocking it as shown in Fig. 10, releasing the dog 125 and freeing the unit from any clamping action. The operation is the same in effect as the first described construction, only in this form, the pawl is rocked on the trunnions to release the dog 125 instead of the first described construction where the pawl 70 is rocked on the bolt 6 to release the dog 66.

I claim:

1. In a device of the kind described, means to be secured to the rotating drive shaft of an automotive vehicle, means automatically engaging said shaft to prevent reverse rotation, comprising an expansible member and an operating key, renewable bearing members upon which said key acts, and means to hold said key in operative position, in combination with means to release said key thru movement of a reverse lever rod.

2. In a device of the kind described, means to be secured to the rotating drive shaft of an automotive vehicle, means automatically engaging said shaft to prevent reverse rotation, comprising an expansible member and an operating key, renewable bearing members upon which said key acts, means to hold said key in operative position, in combination with means to release said key thru movement of a reverse lever rod, and means to reset the operative mechanism by a yielding connection with the brake pedal of the vehicle.

3. In a device of the kind described, in combination with the transmission shifting rods of an automobile, of a unit containing automatic no-roll-back mechanism, comprising a pivoted pawl and a locking dog normally in engagement to render said no-roll-back mechanism in operative position, said pawl having a portion in the line of movement of one of the shifting levers, and adapted to be moved by a direct pushing of said rod to release the engagement of said pawl and dog.

CARL A. MATSON.